United States Patent
Cordes et al.

(10) Patent No.: US 12,408,009 B2
(45) Date of Patent: Sep. 2, 2025

(54) ADAPTIVE PUSH TO TALK SWITCH DETECTION

(71) Applicant: ZEBRA TECHNOLOGIES CORPORATION, Lincolnshire, IL (US)

(72) Inventors: Kevin Cordes, Miller Place, NY (US); Tong-Hsiao Chang, Manhasset, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 299 days.

(21) Appl. No.: 18/121,897

(22) Filed: Mar. 15, 2023

(65) Prior Publication Data

US 2023/0319516 A1    Oct. 5, 2023

Related U.S. Application Data

(60) Provisional application No. 63/325,773, filed on Mar. 31, 2022.

(51) Int. Cl.
*H04W 4/10* (2009.01)
*G06F 3/16* (2006.01)

(52) U.S. Cl.
CPC ............. *H04W 4/10* (2013.01); *G06F 3/165* (2013.01)

(58) Field of Classification Search
CPC ........ H04B 1/3827; H04B 1/385; H04B 1/46; H04M 1/6041; H04M 1/6058; H04M 1/6066; H04M 1/72409; H04R 3/00; H04R 2499/11; H04R 1/1041; H04R 5/033; H04R 2201/107; H04R 2420/07; H04R 2420/09; H04W 4/10; H04W 4/16
See application file for complete search history.

(56) References Cited

U.S. PATENT DOCUMENTS

| | | | | |
|---|---|---|---|---|
| 5,555,533 A | * | 9/1996 | Peck | H04B 11/00 367/901 |
| 2009/0296952 A1 | * | 12/2009 | Pantfoerder | H04R 1/1041 381/74 |
| 2012/0238237 A1 | * | 9/2012 | Crestol | H04W 4/10 455/41.3 |
| 2014/0315502 A1 | * | 10/2014 | Lassally | H04B 1/005 455/90.2 |
| 2015/0105117 A1 | * | 4/2015 | Larson | H04M 1/6066 455/518 |
| 2015/0244406 A1 | * | 8/2015 | Abdullah | H04M 1/6041 455/90.2 |
| 2016/0309251 A1 | * | 10/2016 | Poulsen | H04M 1/6058 |

* cited by examiner

*Primary Examiner* — Cindy Trandai

(57) ABSTRACT

Systems and methods for detecting a state of at least one button are disclosed herein. The method detects a first signal of a headset of a user. The first signal is indicative of the headset being coupled to a device. The headset has a microphone and at least one button. The method determines, based on the detected first headset signal, a first voltage of the microphone, and sets, based on the first voltage of the microphone, a threshold voltage for detecting a state of the at least one button. The method stores the threshold voltage and determines a second voltage of the microphone. The method compares the second voltage of the microphone and the stored threshold voltage, and generates, based on the comparison, a signal indicative of a state of the at least one button.

18 Claims, 10 Drawing Sheets

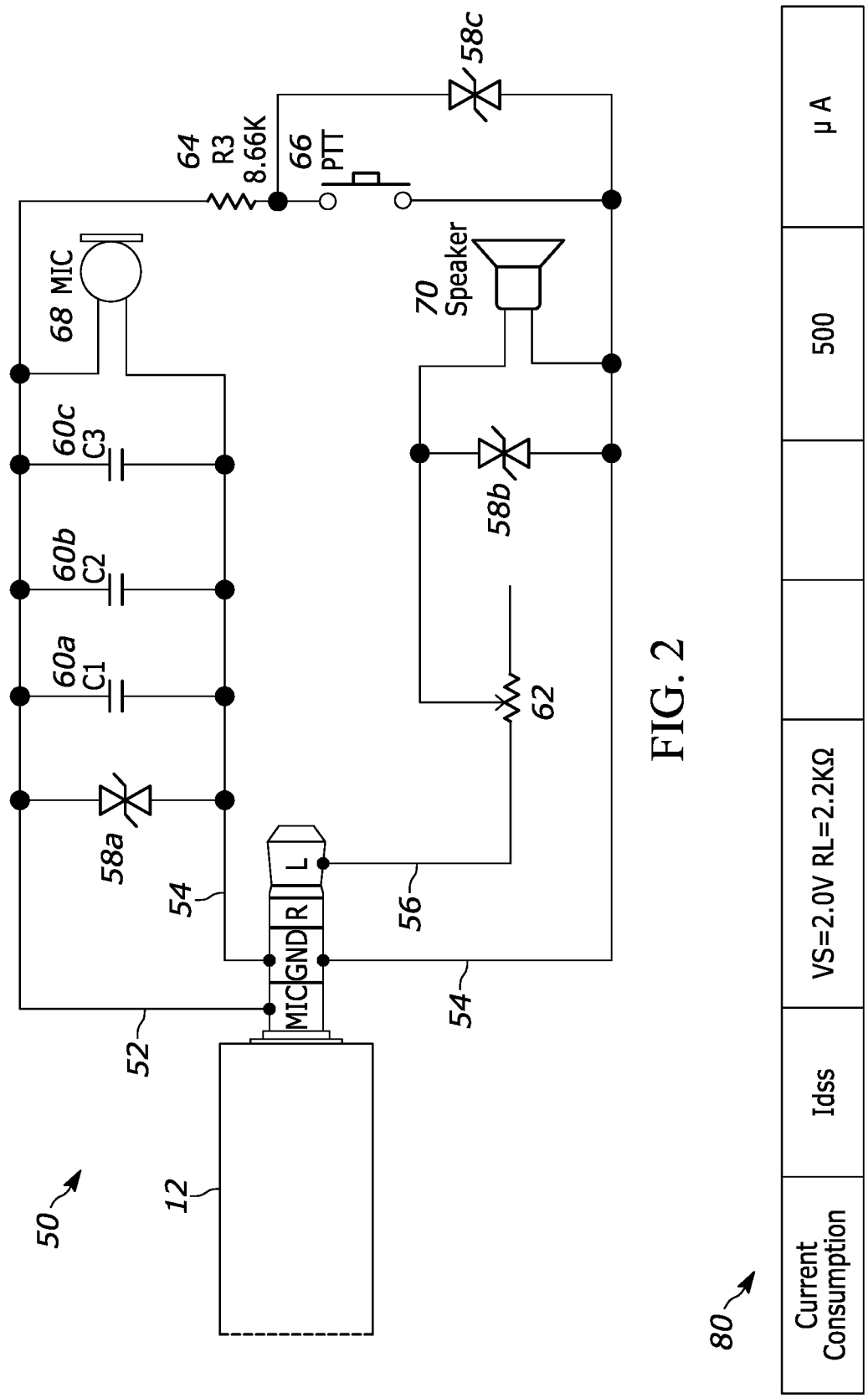

ADAPTIVE PUSH TO TALK SWITCH DETECTION

BACKGROUND

A wired analog headset with a 3.5 mm connector (e.g., a phone connector) can connect to a device (e.g., a laptop, tablet, smartphone, etc.) and can support various functions via a plurality of headset buttons (e.g., volume up, volume down, play, stop, etc.). Each button, when pressed by a user, positions a shunt resistor across the microphone connection. These shunt resistors are low value resistors and can sway the resulting voltage level away from the nominal microphone audio signal level to avoid false button press detection. A headset can implement a push to talk (PTT) application via a PTT button which requires a user to press and hold the PTT button when speaking and to release the PTT button when listening. The PTT button, when pressed, positions a resistor across a microphone connection to the device to indicate that PTT is active. A PTT button is not well suited for use with a low value resistor because it can attenuate the microphone audio signal.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 2 is a circuit diagram illustrating a PTT application of the wired analog headset of FIG. 1.

FIG. 3 is a table illustrating current consumption of a microphone.

Figure 1:
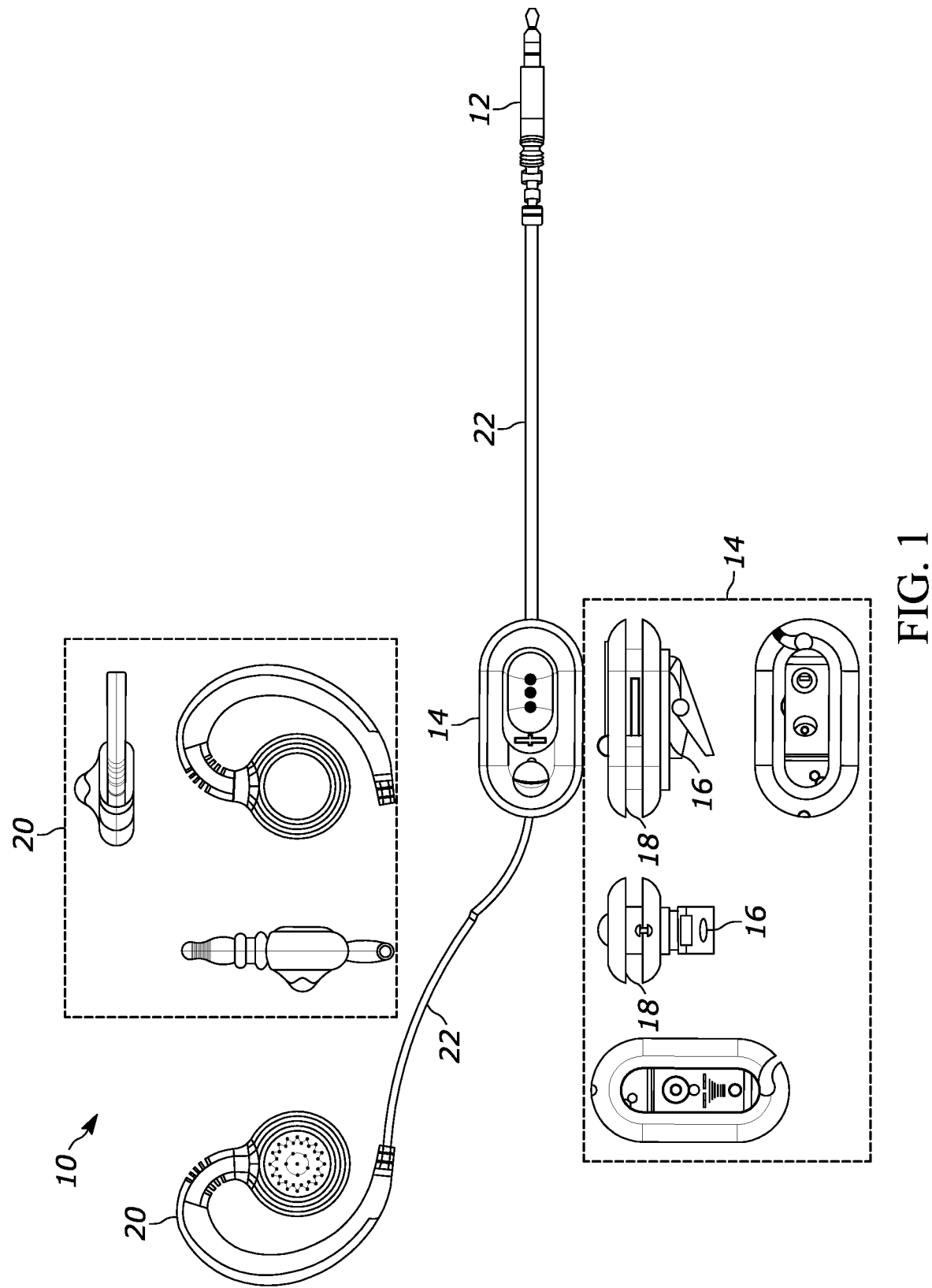
FIG. 1 is a diagram of a wired analog headset.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method for detecting a state of at least one button, comprising: detecting a first signal of a headset of a user, the first signal being indicative of the headset being coupled to a device, and the headset having a microphone and at least one button; determining, based on the detected first headset signal, a first voltage of the microphone; setting, based on the first voltage of the microphone, a threshold voltage for detecting a state of the at least one button; storing the threshold voltage; determining a second voltage of the microphone; comparing the second voltage of the microphone and the stored threshold voltage; and generating, based on the comparison, a signal indicative of a state of the at least one button.

Additional examples disclosed herein are directed to a system for detecting a state of at least one button comprising a memory configured to store computer executable instructions; and a processor configured to interface with the memory and execute the computer executable instructions to cause the processor to: detect a first signal of a headset of a user, the first signal being indicative of the headset being coupled to a device, and the headset having a microphone and at least one button, determine, based on the detected first headset signal, a first voltage of the microphone, set, based on the first voltage of the microphone, a threshold voltage for detecting a state of the at least one button, store the threshold voltage in the memory, determine a second voltage of the microphone, compare the second voltage of the microphone and the stored threshold voltage, and generate, based on the comparison, a signal indicative of a state of the at least one button.

Additional examples disclosed herein are directed to a tangible machine-readable medium comprising instructions for detecting a state of at least one button that, when executed, cause a machine to at least: detect a first signal of a headset of a user, the first signal being indicative of the headset being coupled to a device, and the headset having a microphone and at least one button; determine, based on the detected first headset signal, a first voltage of the microphone; set, based on the first voltage of the microphone, a threshold voltage for detecting a state of the at least one button; store the threshold voltage; determine a second voltage of the microphone; compare the second voltage of the microphone and the stored threshold voltage; and generate, based on the comparison, a signal indicative of a state of the at least one button.

As mentioned above, a headset can implement a PTT application via a PTT button which requires a user to press and hold a PTT button when speaking and release the PTT button when listening. The PTT button, when pressed, positions a resistor across a microphone connection to the device to indicate that PTT is active. A PTT button is not well suited for use with a low value resistor because it can attenuate the microphone audio signal.

A known approach includes positioning a higher value resistor (e.g., 8.66K Ω) across the PTT button to minimize attenuation on the microphone audio signal. A device can be interrupted when a resistor is connected in parallel with the microphone. This interrupt is generated by a comparison of the microphone signal to a fixed threshold. For example, when the resistor is connected or disconnected across the microphone (e.g., a PTT button is pressed or released), the threshold is crossed, thus creating an interrupt signal (e.g., via a comparator). However, this approach can make PTT button detection challenging because microphone current can vary greatly from headset to headset. Therefore, setting a fixed universal threshold for all headsets is implausible.

Accordingly, it would be highly beneficial to develop a system and method that can determine and utilize a threshold that is adaptable for different headsets where the threshold is determined when the headset is connected to a device. The systems and methods of the present disclosure address these and other needs.

FIG. 1 is a diagram of a wired analog headset 10 and components thereof. The headset 10 comprises a connector 12 (e.g., a phone connector), a PTT button 14 having a clip 16 and a cord wrap 18, a rotatable earpiece 20 and a cord 22 that couples the connector 12, PTT button 14 and rotatable earpiece 20. The clip 16 allows a user to attach the PTT button 14 to clothing of the user and the cord wrap 18 is an annular recess along a periphery of the PTT button 14 that allows for wrapping the cord 22 when storing the headset 10.

FIG. 2 is a circuit diagram 50 illustrating a PTT application of the wired analog headset 10 of FIG. 1. As shown in FIG. 2, a connector 12 is coupled to several components including electrostatic discharge suppressors 58a, 58b and 58c; capacitors 60a, 60b, and 60c; a potentiometer 62; a resistor 64 (e.g., 8.66K Ω); a PTT switch 66 (e.g., a PTT button 14); a microphone 68; and a speaker 70. The connector 12 is coupled to these components via a microphone signal 52, ground signals 54 and a left audio signal 56. The headset 10 can include a PTT feature that allows a user to communicate. Built into the headset is a switch 66 (e.g., a PTT button 14) that the user can press when he/she wishes to speak. As shown in FIG. 2, the switch 66 positions a resistor 64 (e.g., 8.66K Ω) across the microphone connection 52 to a mobile device to indicate PTT has been activated.

FIG. 3 is a table 80 illustrating current consumption of a microphone. Microphone current can vary greatly from headset to headset. When a resistor is connected in parallel with the microphone, a host device is interrupted. This interrupt is generated by a comparison of the microphone signal to a fixed threshold. For example, when the resistor is connected or disconnected across the microphone (e.g., a PTT button is pressed or released), the threshold is crossed, thus creating an interrupt signal (e.g., via a comparator). Since microphone current can vary greatly from headset to headset, setting a fixed universal threshold for all headsets is implausible.

Figure 4A:
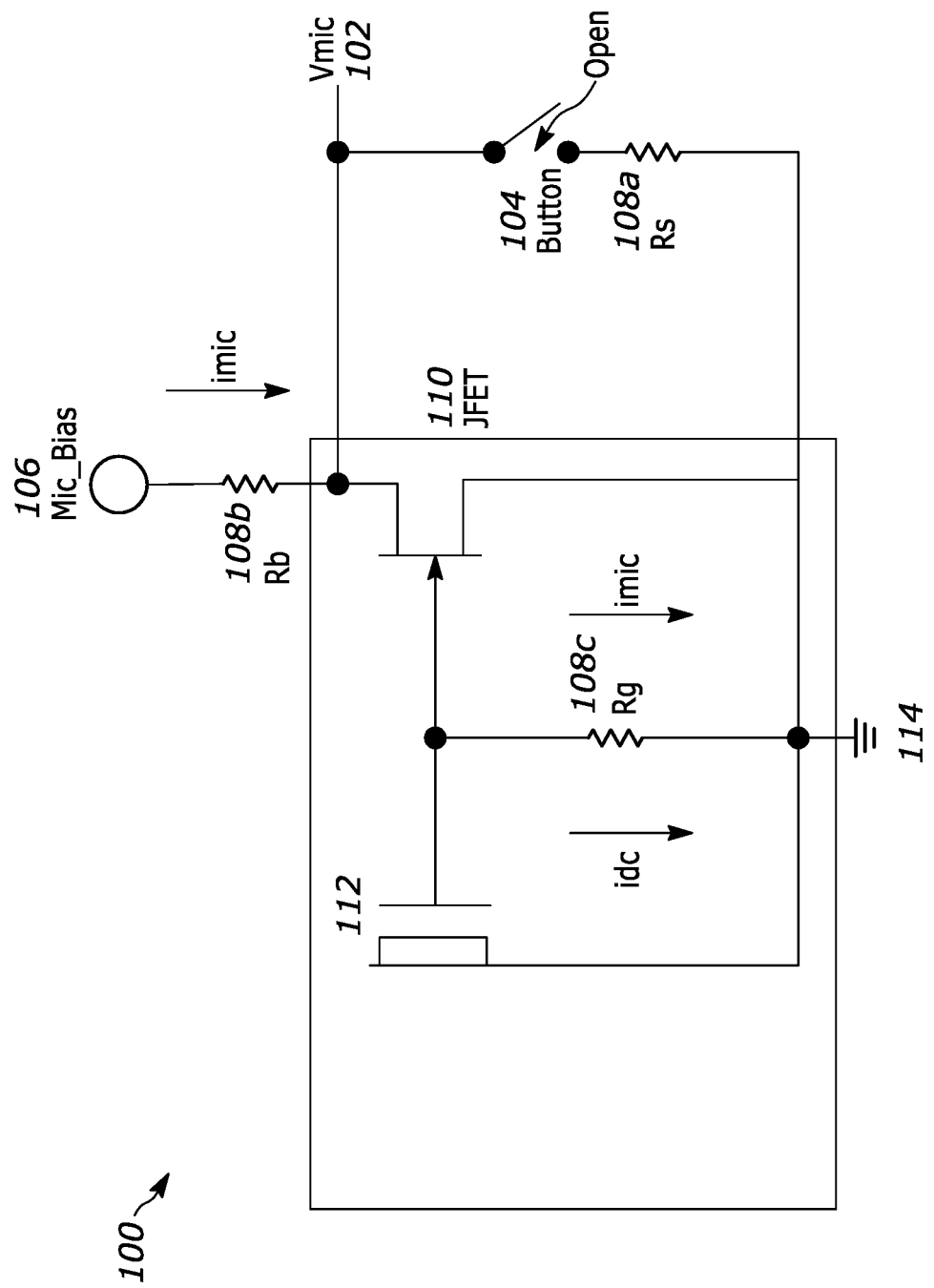
FIG. 4A is a circuit diagram of a microphone illustrating a PTT application when a PTT button is open.
Figure 4B:
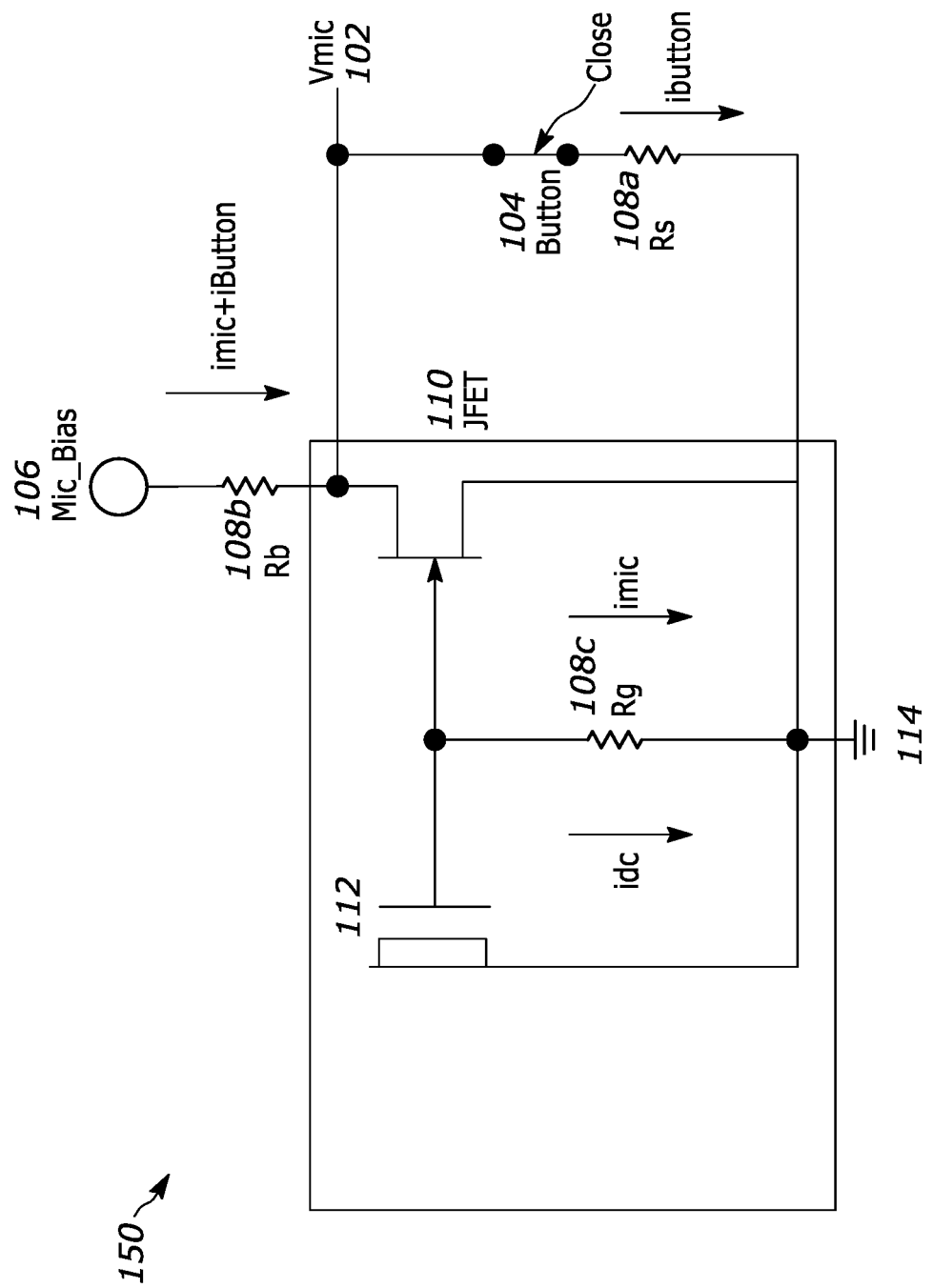
FIG. 4B is a circuit diagram of a microphone illustrating a PTT application when a PTT button is closed.

FIGS. 4A and 4B are circuit diagrams of a commonly used headset mircophone respectively illustrating a PTT application when a PTT button is open and when the PTT button is closed. As shown in FIG. 4A, the circuit diagram 100 illustrates a PTT application when a PTT button 104 is open (e.g., released). The circuit diagram 100 includes several signals and components including microphone voltage 102 (e.g., $V_{mic}$); PTT button 104; microphone bias voltage 106 (e.g., Mic_Bias); resistors 108a (e.g., source resistor $R_s$), 108b (e.g., bias resistor $R_b$), and 108c (e.g., gate resistor $R_g$); junction-gate field-effect transistor (JFET) 110; microphone 112; and ground 114. The microphone 112 generates internal current $I_{dc}$ when the Mic_Bias voltage 106 is applied externally via the bias resistor $R_b$ 108b. This current induces microphone current $I_{mic}$ through the JFET 110 converter. Since microphone current $I_{mic}$ is the only current through the bias resistor $R_b$ 108b, the voltage across $V_{mic}$ 102 can be given by Equation 1 below:

$$V_{mic} = \text{Mic\_Bias} - I_{mic} * R_b \quad \text{Equation 1}$$

As shown in FIG. 4B, the circuit diagram 150 illustrates a PTT application when a PTT button 104 is closed (e.g., pressed). Microphone current $I_{mic}$ and a button current $I_{button}$ run through the bias resistor $R_b$ 108b when the PTT button 104 is closed. This results in a voltage change of $R_b * I_{button}$ across $V_{mic}$ 102. As such, two distinctive voltages can be detected. These two voltages can vary from headset to headset when internal current $I_{dc}$ or direct current (DC) $I_{mic}$ is not well specified by a microphone manufacturer (e.g., Electret). Thus, there is no defined voltage range for $V_{mic}$ 102 when a Mic_Bias voltage 106 is applied. Therefore, a PTT detector must account for varying biased voltages and voltage differentials. Accordingly, it would be highly beneficial to develop a system and method that can determine an adaptable voltage threshold for different headsets, upon the insertion of a headset into a device, to facilitate PTT detection. The systems and methods of the present disclosure address these and other needs.

The systems and methods of the present disclosure can determine, at the insertion of a headset into a device, a voltage threshold adaptable to the headset. Upon insertion of a headset, a host is notified by a HEADSET_DETECT signal. Once detected, the host can utilize an analog to digital converter (ADC) to measure a microphone voltage (e.g., $V_{mic}$). As mentioned above, this voltage can vary from headset to headset and has a direct relationship to the microphone current. The microphone voltage is scaled to an appropriate threshold (e.g., $0.87 * V_{mic}$). This scaling is dependent on a PTT resistor and a Mic_Bias voltage, which are fixed and have a tighter tolerance than the microphone current. When a user presses the PTT button, the PTT resistor pulls down on the $V_{mic}$ node thereby reducing its voltage. This change in voltage thus crosses the threshold. Crossing the threshold interrupts the host and, in response, the host executes actions required for PTT. The threshold is reset upon the removal of the headset.

Figure 5:
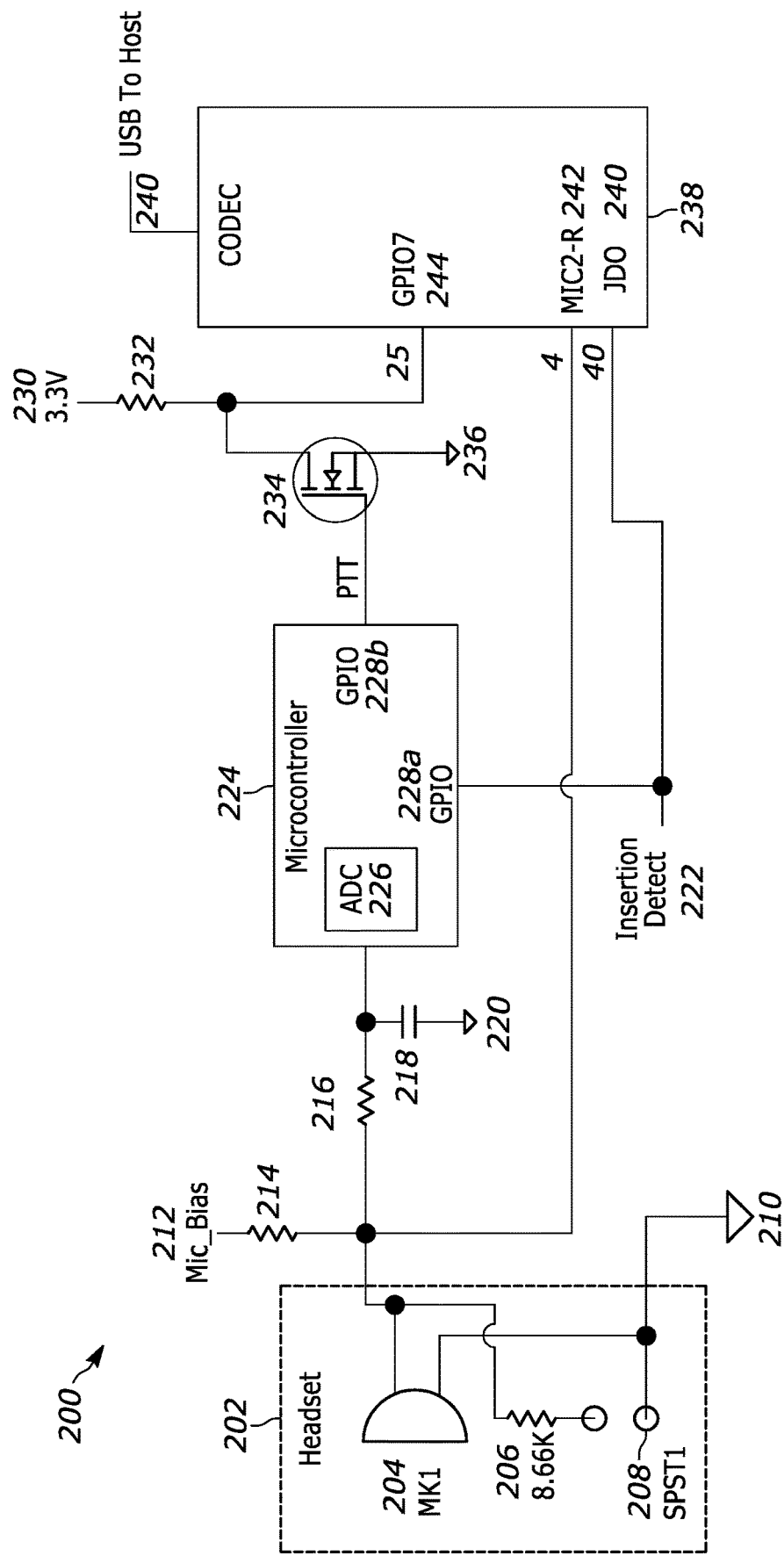
FIG. 5 is a circuit diagram illustrating an embodiment of the system of the present disclosure.

FIG. 5 is a circuit diagram 200 illustrating an embodiment of the system of the present disclosure. The circuit diagram 200 includes several signals and components including a headset 202, a microphone bias voltage 212 (e.g., Mic_Bias); resistors 214, 216, and 232; a capacitor 218; an insertion detection 222; a microcontroller 224, a 3.3 voltage source 230; a metal oxide semiconductor field effect transistor (MOSFET) 234; grounds 210, 220 and 236; and a coder-decoder (CODEC) 238. The headset 202 is directly or indirectly coupled to these components via signal lines, the microcontroller 224, and the CODEC 238. The headset 202 includes a microphone 204, a resistor 206 (e.g., 8.66K Ω), and a switch 208 (e.g., single-pole single-throw), the microcontroller 224 includes an ADC 226 and general-purpose input/output (GPIO) pins 228a and 228b, and the CODEC 238 includes a jack detection (JD) pin 240, a microphone audio (e.g., MIC2-R) pin 242; and a GPIO pin 244.

As shown in FIG. 5, on insertion of the headset 202, the system measures a voltage of a headset microphone 204 using the ADC 226 of the microcontroller 224. The system determines a voltage threshold and sets the threshold in the system memory. The system monitors a microphone signal to determine when the microphone signal crosses the threshold. When the microphone signal crosses the threshold (e.g., in either direction), the GPIO pin 228a is triggered to indicate PTT detection (e.g., activation or deactivation) to the CODEC 238. In response, the CODEC 238 transmits a signal 240 indicative of PTT detection via a universal serial bus (USB) human interface device (HID) to the host system. The system resets the threshold when the headset 202 is disconnected.

Figure 6:
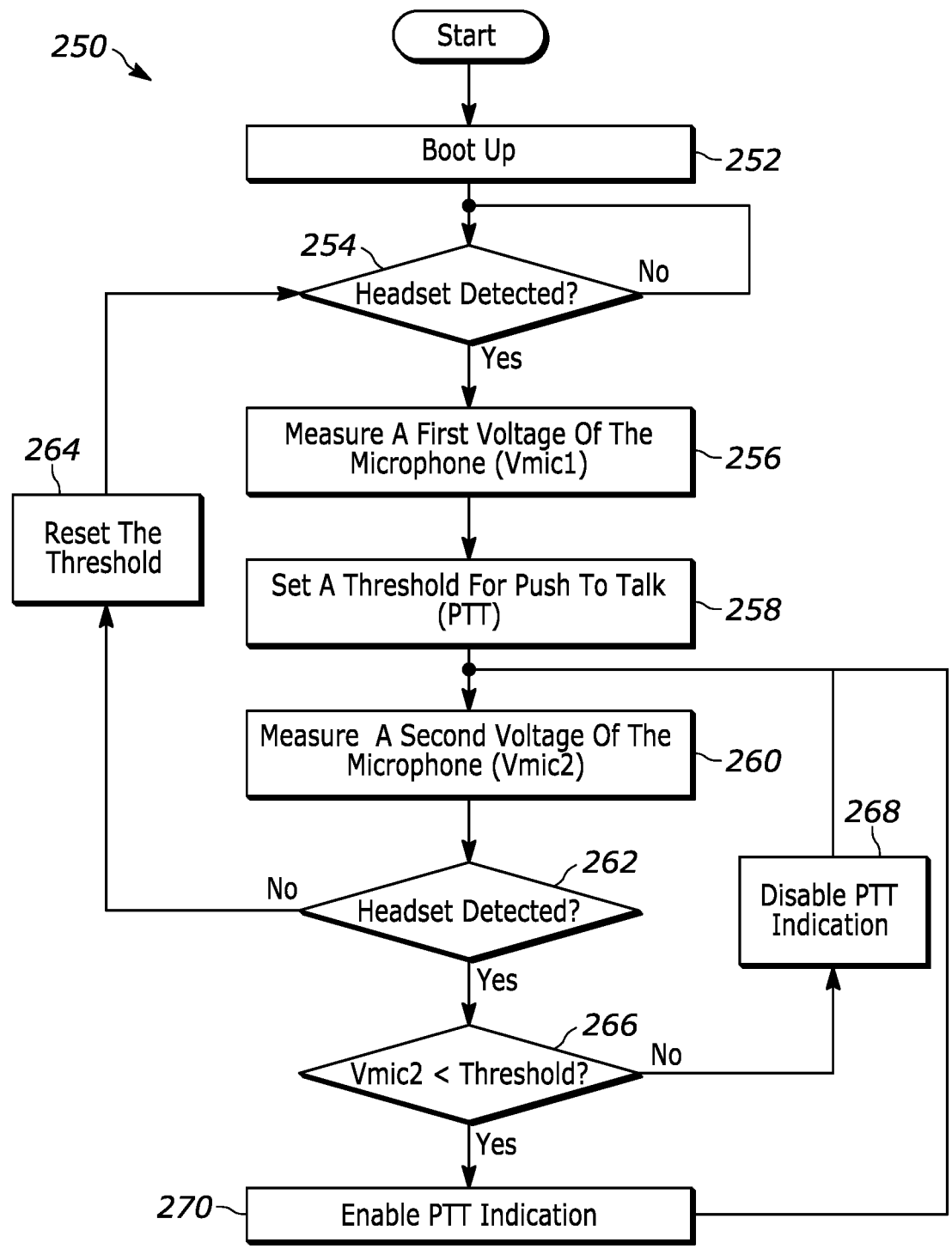
FIG. 6 is a flowchart illustrating processing steps carried out by the system of FIG. 5.

FIG. 6 is a flowchart 250 illustrating processing steps carried out by the system of FIG. 5. Beginning in step 252, the system enters a boot up state. In step 254, the system determines whether a headset 202 is detected. For example, the system determines whether the headset 202 is coupled to a device. If the system detects a headset 202, then the process proceeds to step 256. Alternatively, if the system does not detect a headset 202, the process returns to step 254. Then, in step 256, the system measures a first voltage of the microphone 204 (e.g., $V_{mic1}$). In step 258, the system sets a threshold (e.g., $0.87*V_{mic1}$) for PTT and, in step 260, the system measures a second voltage of the microphone 204 (e.g., $V_{mic2}$). In step 262, the system determines whether a headset 202 is detected. For example, the system determines whether the headset 202 remains coupled to a device. If the system detects a headset 202, then the process proceeds to step 266. Alternatively, if the system does not detect a headset 202, the process proceeds to step 264 and, in step 264, the system resets the threshold for PTT before returning to step 254. In step 266, the system determines whether the second microphone voltage $V_{mic2}$ is less than the threshold. If the system determines the second microphone voltage $V_{mic2}$ is less than the threshold, then the process proceeds to step 270. In step 270, the system generates an enable PTT indication (e.g., a signal). The process then returns to step 260. Alternatively, if the system determines the second microphone voltage $V_{mic2}$ is not less than the threshold, then the process proceeds to step 268. In step 268, the system generates a disable PTT indication (e.g., a signal). The process then returns to step 260.

Figure 7:
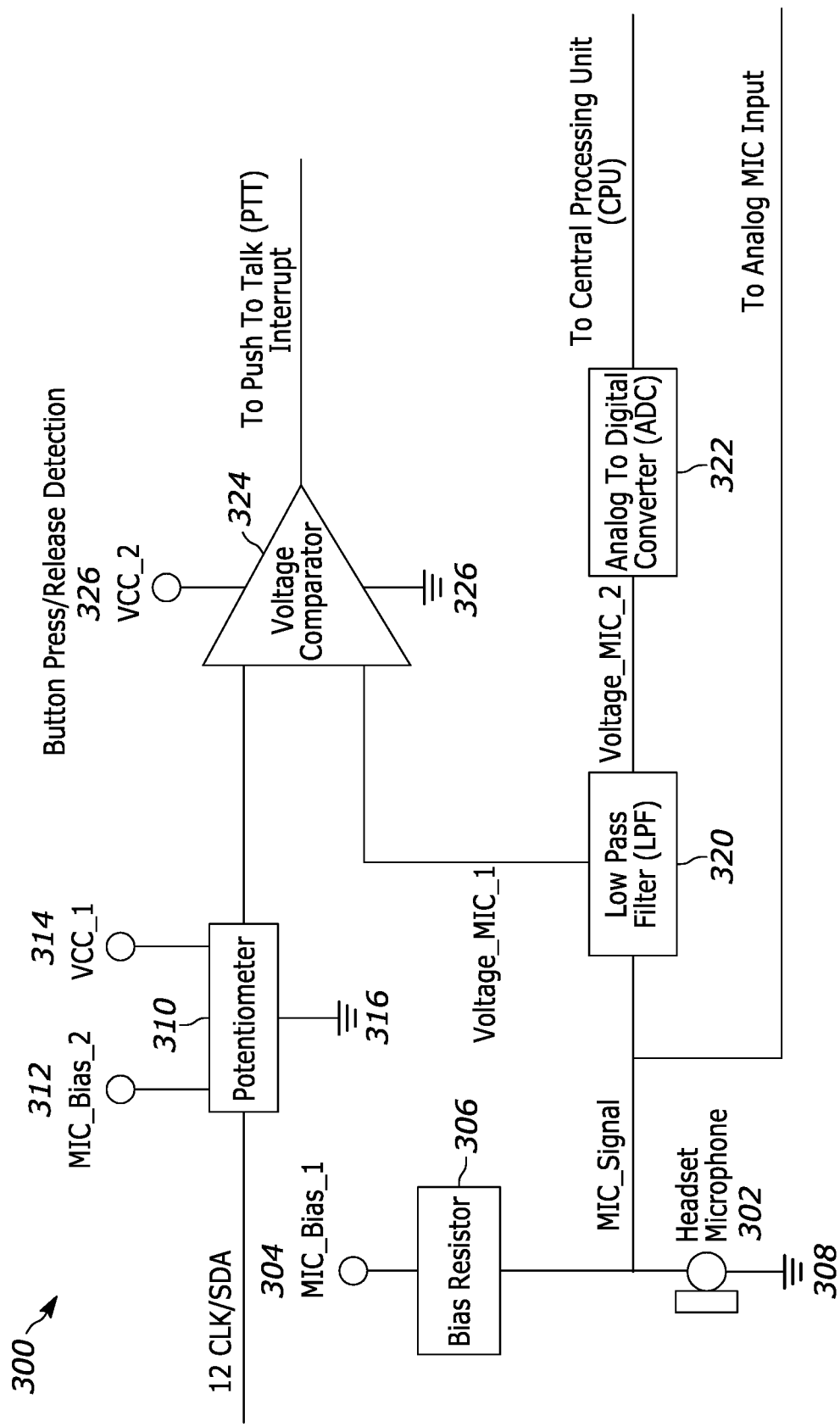
FIG. 7 is a circuit diagram illustrating another embodiment of the system of the present disclosure.

FIG. 7 is a circuit diagram 300 illustrating another embodiment of the system of the present disclosure. The circuit diagram 300 includes several signals and components including a headset microphone 302, a microphone bias voltage 304 (e.g., Mic_Bias_1); a bias resistor 306; a microphone bias voltage 312 (e.g., Mic_Bias_1) and voltage at collector 314 (e.g., VCC_1) of a potentiometer 310 (e.g., a digital trimming potentiometer or Digi Trimpot); a low pass filter (LPF) 320; an ADC 322; a supply voltage 326 (e.g., VCC_2) of a voltage comparator 324; and grounds 308, 316 and 326. The system can be implemented via hardware components and software. The system captures a voltage level of the headset microphone 302 when the headset is inserted and utilizes the voltage level of the headset microphone 302 as a baseline to accurately detect subsequent voltage changes based on PTT button press and release. As shown in FIG. 7, the system filters a signal of the headset microphone 302 (e.g., MIC Signal) via an LPF 320 before transmitting the MIC Signal to each of a voltage comparator 324 and an ADC 322. For example, the LPF 320 transmits a first microphone voltage signal (e.g., Voltage_MIC_1) to the voltage comparator 324 and a second microphone voltage signal (e.g., Voltage_MIC_2) to the ADC 322. The ADC 322 senses the Voltage_MIC_2 signal when a headset is inserted. Subsequently, the system generates a PTT button voltage detection reference and stores it in a potentiometer 310 (e.g., a digital trimming potentiometer or Digi Trimpot) via an integrated circuit (I2C) interface. The system compares the Voltage_MIC_1 signal with the detection reference via the voltage comparator 324 and transmits a PTT interrupt signal when the Voltage_MIC_1 signal crosses the detection reference. Additionally, the system measures, via a central processing unit (CPU), the Voltage_MIC_2 signal to validate a PTT button status.

Figure 8:
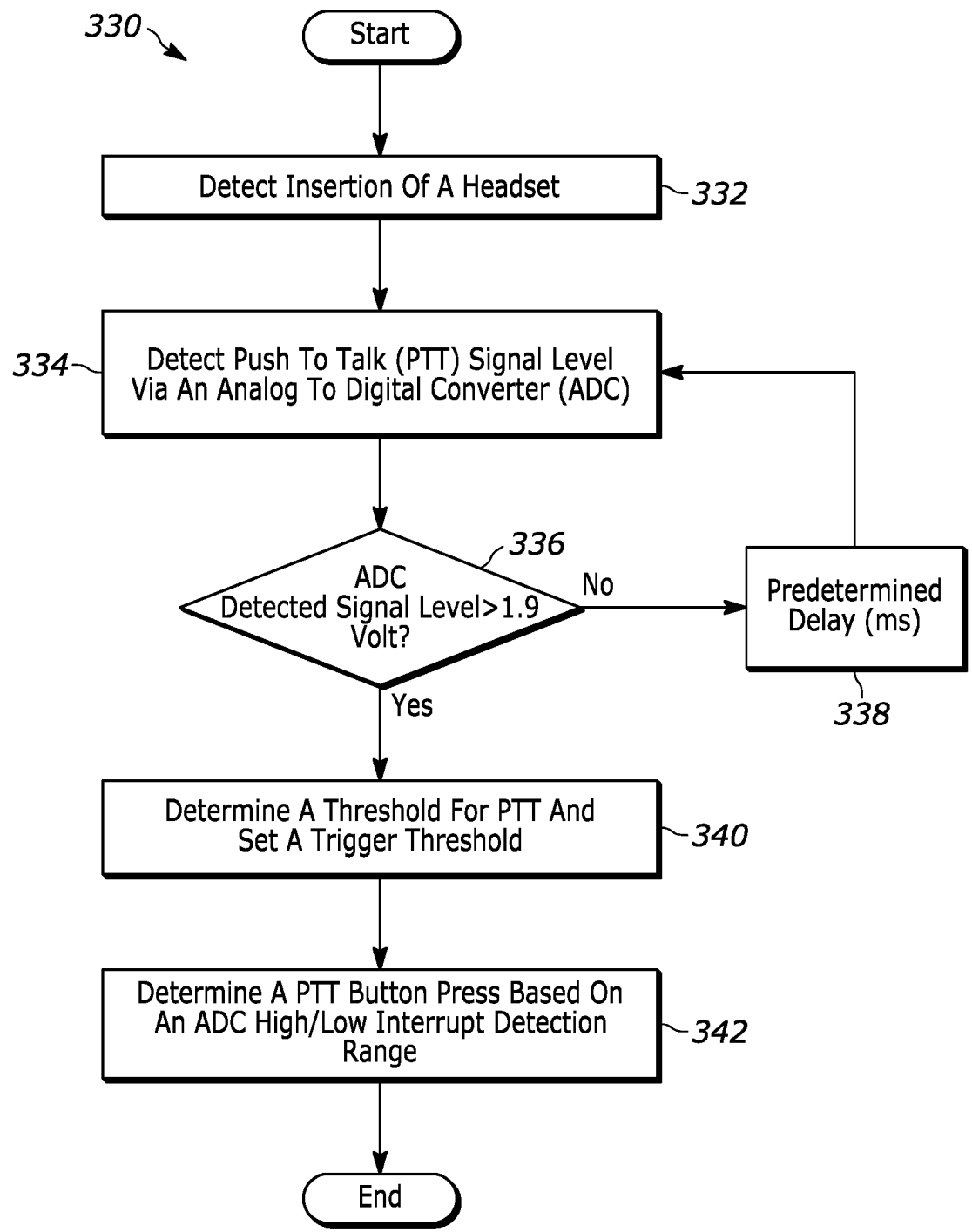
FIG. 8 is a flowchart illustrating processing steps carried out by the system of FIG. 7 for determining and setting a PTT reference voltage.

FIG. 8 is a flowchart 330 illustrating processing steps carried out by the system of FIG. 7 for determining and setting a PTT reference voltage. Beginning in step 332, the system detects an insertion of a headset. In step 334, the system detects a voltage level of a PTT signal via an ADC. Then, in step 336, the system determines whether the detected voltage level of the PTT signal is greater than 1.9 volts. If the system determines the detected voltage level of the PTT signal is not greater than 1.9 volts, then the process proceeds to step 330. In step 330, the system effects a predetermined delay (e.g., 10 ms) before returning to step 334. Alternatively, if the system determines the detected voltage level of the PTT signal is greater than 1.9 volts, then the process proceeds to step 340. In step 340, the system determines a threshold for PTT and sets a trigger threshold. In step 342, the system determines a PTT button press based on a High and Low interrupt detection range of the ADC.

Figure 9:
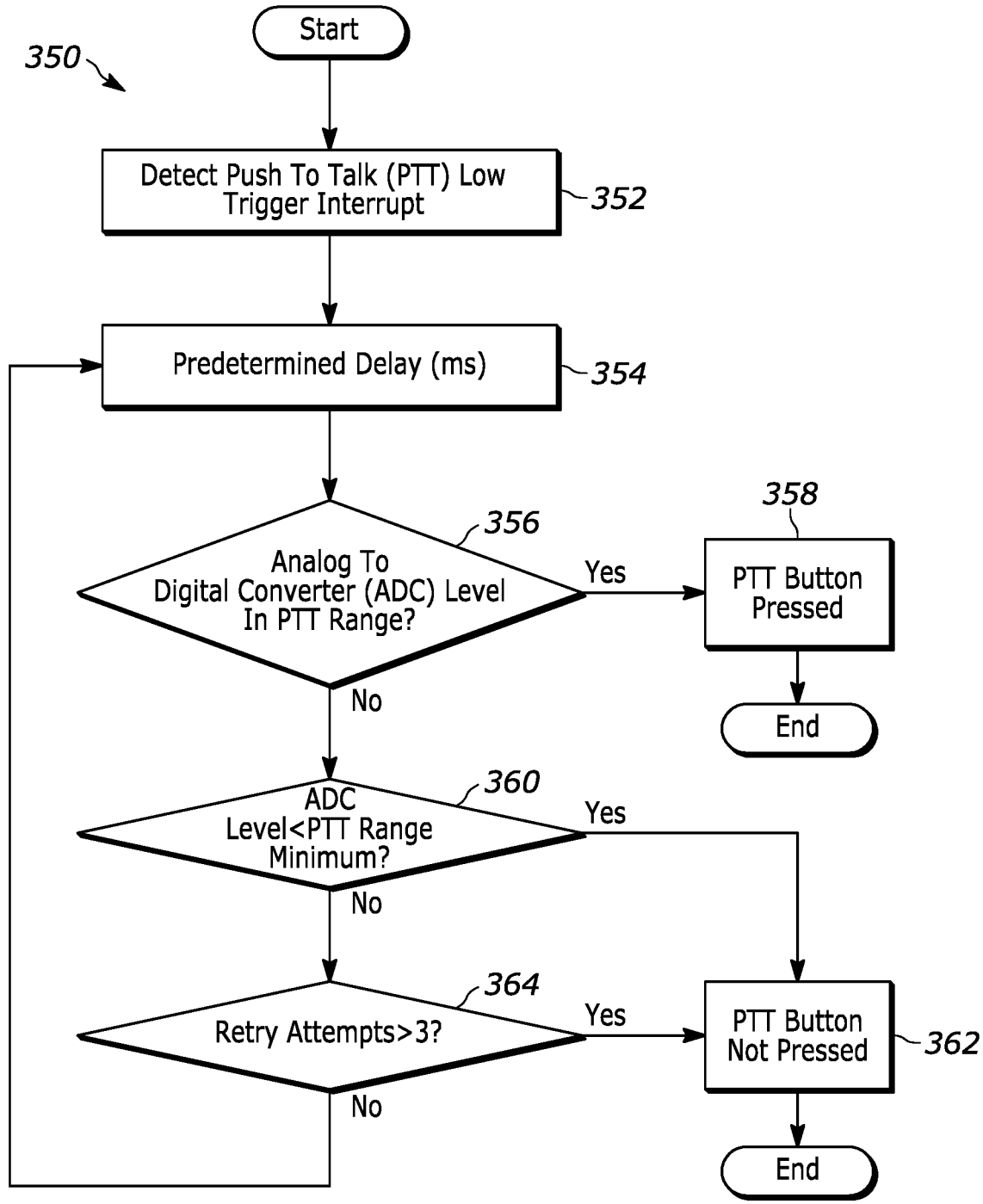
FIG. 9 is a flowchart illustrating processing steps carried out by the system of FIG. 7 for determining a valid PTT activation.

FIG. 9 is a flowchart 350 illustrating processing steps carried out by the system of FIG. 7 for determining a PTT activation. Beginning in step 352, the system detects a PTT low trigger interrupt signal. In step 354, the system effects a predetermined delay (e.g., 10 ms). In step 356, the system determines whether a voltage level of the detected PTT low trigger interrupt signal is within a PTT range. If the system determines the voltage level of the detected PTT low trigger interrupt signal is within a PTT range, then the process proceeds to step 358. In step 358, the system determines that a PTT button is pressed (e.g., by a user) and the process ends. Alternatively, if the system determines the voltage level of the detected PTT low trigger interrupt signal is not within a PTT range, then the process proceeds to step 360. In step 360, the system determines whether the voltage level of the detected PTT low trigger interrupt signal is less than a minimum of the PTT range. If the system determines the voltage level of the detected PTT low trigger interrupt signal is less than a minimum of the PTT range, then the process proceeds to step 362. Then, in step 362, the system determines that a PTT button is not pressed (e.g., by a user) and the process ends. Alternatively, if the system determines the voltage level of the detected PTT low trigger interrupt signal is not less than a minimum of the PTT range, then the process proceeds to step 364. In step 364, the system determines whether the number of retry attempts is greater than a predetermined threshold (e.g., an integer value such as 3). If the system determines the number of retry attempts is greater than a predetermined threshold, then the process proceeds to step 362. Then, in step 362, the system determines that a PTT button is not pressed (e.g., by a user) and the process ends. Alternatively, if the system determines the number of retry attempts is not greater than a predetermined threshold, then the process returns to step 354.

Figure 10:
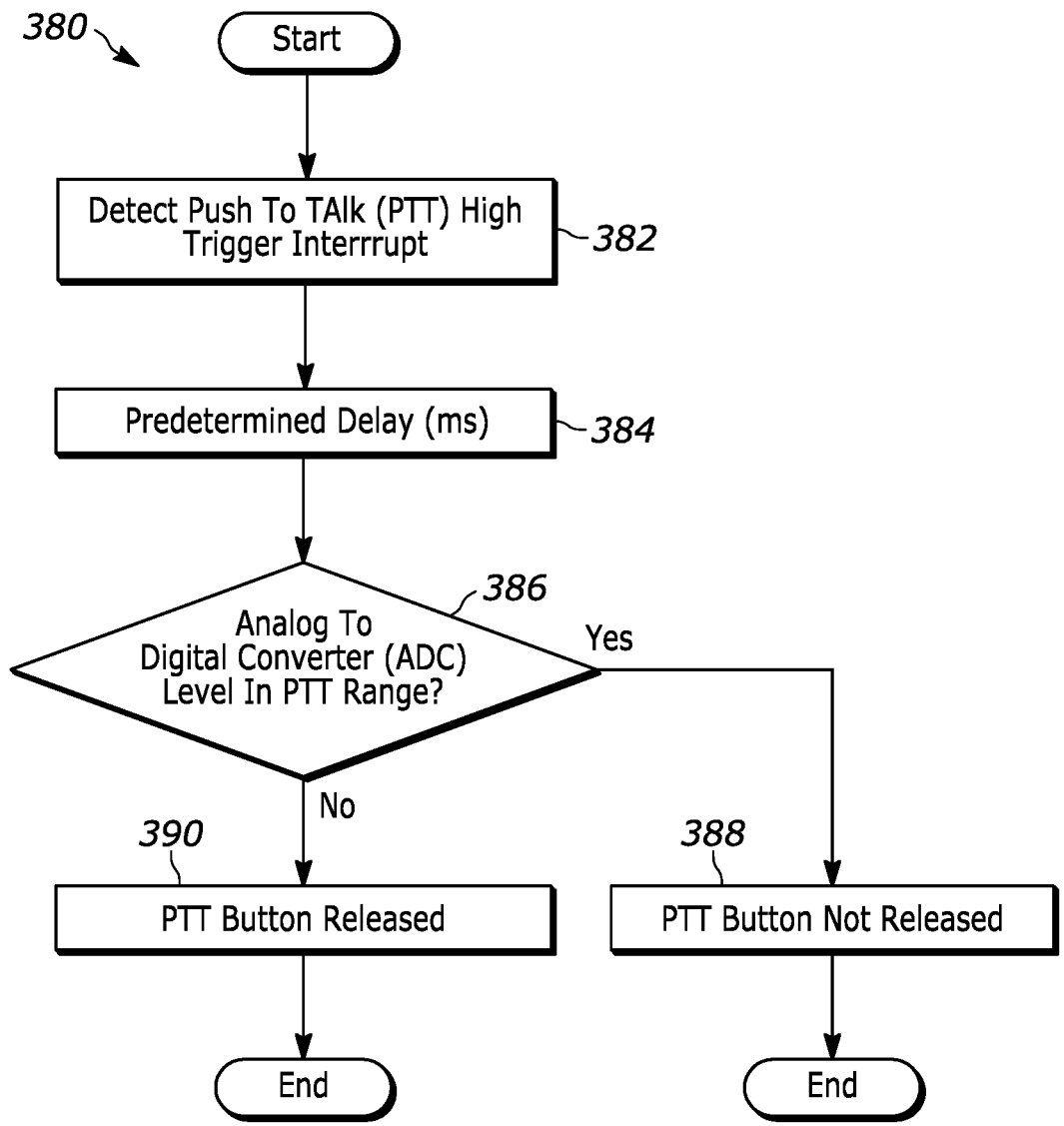
FIG. 10 is a flowchart illustrating processing steps carried out by the system of FIG. 7 for determining a valid PTT deactivation.

FIG. 10 is a flowchart 380 illustrating processing steps carried out by the system of FIG. 7 for determining a PTT deactivation. Beginning in step 382, the system detects a PTT high trigger interrupt signal. In step 384, the system effects a predetermined delay (e.g., 10 ms). In step 386, the system determines whether a voltage level of the detected PTT high trigger interrupt signal is within a PTT range. If the system determines the voltage level of the detected PTT high trigger interrupt signal is within a PTT range, then the process proceeds to step 388. In step 388, the system determines that a PTT button is not released (e.g., by a user) and the process ends. Alternatively, if the system determines the voltage level of the detected PTT high trigger interrupt signal is not within a PTT range, then the process proceeds to step 390. In step 390, the system determines that a PTT button is released (e.g., by a user) and the process ends.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed:

1. A method for detecting a state of at least one button, comprising:
    detecting a first signal of a headset of a user, the first signal being indicative of the headset being coupled to a device, and the headset having a microphone and the at least one button;
    determining, based on the detected first headset signal, a first voltage of the microphone;
    setting, based on the first voltage of the microphone, a threshold voltage for detecting a state of the at least one button;
    storing the threshold voltage;
    determining a second voltage of the microphone;
    comparing the second voltage of the microphone and the stored threshold voltage; and
    generating, based on the comparison, a signal indicative of a state of the at least one button.

2. The method of claim 1, further comprising:
    determining whether a second signal of the headset is detected, the second signal being indicative of the headset remaining coupled to the device; and
    comparing the second voltage of the microphone and the stored threshold voltage when the second signal of the headset is detected.

3. The method of claim 1, further comprising:
    determining whether a second signal of the headset is detected, the second signal being indicative of the headset remaining coupled to the device; and
    clearing the set threshold voltage when the second signal of the headset is not detected.

4. The method of claim 1, further comprising:
generating, based on the comparison, a signal indicative of an enable state of the at least one button when the second voltage of the microphone is less than the stored threshold voltage,
wherein the enable state is indicative of the at least one button being pressed by the user.

5. The method of claim 1, further comprising:
generating, based on the comparison, a signal indicative of a disable state of the at least one button when the second voltage of the microphone is greater than the stored threshold voltage,
wherein the disable state is indicative of the at least one button being released by the user.

6. The method of claim 1, wherein
the at least one button is a push to talk (PTT) button, and
the device is at least one of a smart phone, a tablet, and a mobile computer.

7. A system for detecting a state of at least one button comprising:
a memory configured to store computer executable instructions; and
a processor configured to interface with the memory and execute the computer executable instructions to cause the processor to:
detect a first signal of a headset of a user, the first signal being indicative of the headset being coupled to a device, and the headset having a microphone and the at least one button,
determine, based on the detected first headset signal, a first voltage of the microphone,
set, based on the first voltage of the microphone, a threshold voltage for detecting a state of the at least one button,
store the threshold voltage in the memory,
determine a second voltage of the microphone,
compare the second voltage of the microphone and the stored threshold voltage, and
generate, based on the comparison, a signal indicative of a state of the at least one button.

8. The system of claim 7, wherein the processor is further configured to:
determine whether a second signal of the headset is detected, the second signal being indicative of the headset remaining coupled to the device, and
compare the second voltage of the microphone and the stored threshold voltage when the second signal of the headset is detected.

9. The system of claim 7, wherein the processor is further configured to:
determine whether a second signal of the headset is detected, the second signal being indicative of the headset remaining coupled to the device, and
clear the set threshold voltage when the second signal of the headset is not detected.

10. The system of claim 7, wherein the processor is further configured to:
generate, based on the comparison, a signal indicative of an enable state of the at least one button when the second voltage of the microphone is less than the stored threshold voltage,
wherein the enable state is indicative of the at least one button being pressed by the user.

11. The system of claim 7, wherein the processor is further configured to:
generate, based on the comparison, a signal indicative of a disable state of the at least one button when the second voltage of the microphone is greater than the stored threshold voltage,
wherein the disable state is indicative of the at least one button being released by the user.

12. The system of claim 7, wherein
the at least one button is a push to talk (PTT) button, and
the device is at least one of a smart phone, a tablet, and a mobile computer.

13. A non-transitory tangible machine-readable medium comprising instructions for detecting a state of at least one button that, when executed, cause a machine to at least:
detect a first signal of a headset of a user, the first signal being indicative of the headset being coupled to a device, and the headset having a microphone and the at least one button;
determine, based on the detected first headset signal, a first voltage of the microphone;
set, based on the first voltage of the microphone, a threshold voltage for detecting a state of the at least one button;
store the threshold voltage;
determine a second voltage of the microphone;
compare the second voltage of the microphone and the stored threshold voltage; and
generate, based on the comparison, a signal indicative of a state of the at least one button.

14. The non-transitory tangible machine-readable medium of claim 13, wherein the instructions, when executed, further cause the machine to:
determine whether a second signal of the headset is detected, the second signal being indicative of the headset remaining coupled to the device; and
compare the second voltage of the microphone and the stored threshold voltage when the second signal of the headset is detected.

15. The non-transitory tangible machine-readable medium of claim 13, wherein the instructions, when executed, further cause the machine to:
determine whether a second signal of the headset is detected, the second signal being indicative of the headset remaining coupled to the device, and
clear the set threshold voltage when the second signal of the headset is not detected.

16. The non-transitory tangible machine-readable medium of claim 13, wherein the instructions, when executed, further cause the machine to:
generate, based on the comparison, a signal indicative of an enable state of the at least one button when the second voltage of the microphone is less than the stored threshold voltage,
wherein the enable state is indicative of the at least one button being pressed by the user.

17. The non-transitory tangible machine-readable medium of claim 13, wherein the instructions, when executed, further cause the machine to:
generate, based on the comparison, a signal indicative of a disable state of the at least one button when the second voltage of the microphone is greater than the stored threshold voltage,
wherein the disable state is indicative of the at least one button being released by the user.

18. The non-transitory tangible machine-readable medium of claim 13, wherein
the at least one button is a push to talk (PTT) button, and
the device is at least one of a smart phone, a tablet, and a mobile computer.

* * * * *